Oct. 15, 1935.                R. B. BOURNE                2,017,746
                          SOUND ATTENUATING DEVICE
                  Original Filed April 30, 1934    2 Sheets-Sheet 1
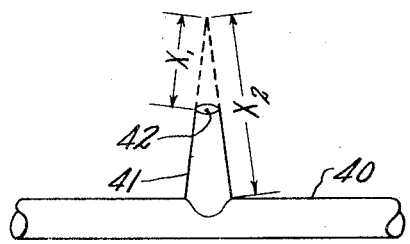
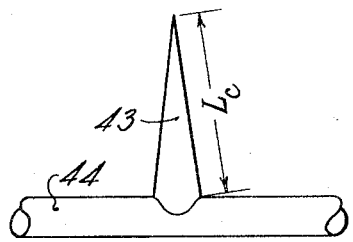
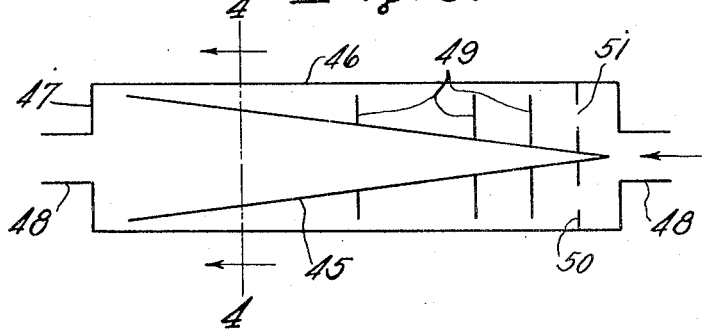
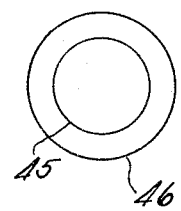
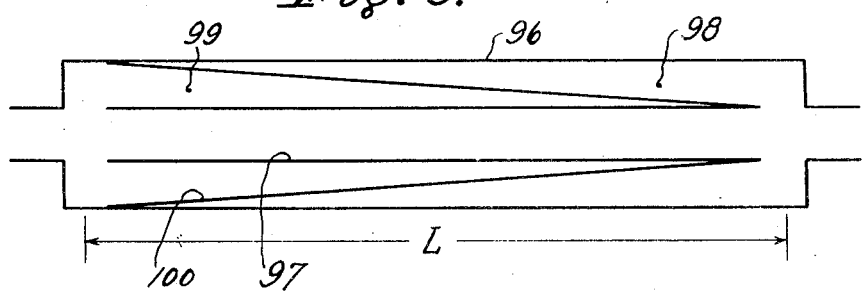
INVENTOR
*Roland B. Bourne*
BY
*Chapin & Neal*
ATTORNEYS Oct. 15, 1935.  R. B. BOURNE  2,017,746
SOUND ATTENUATING DEVICE
Original Filed April 30, 1934  2 Sheets-Sheet 2
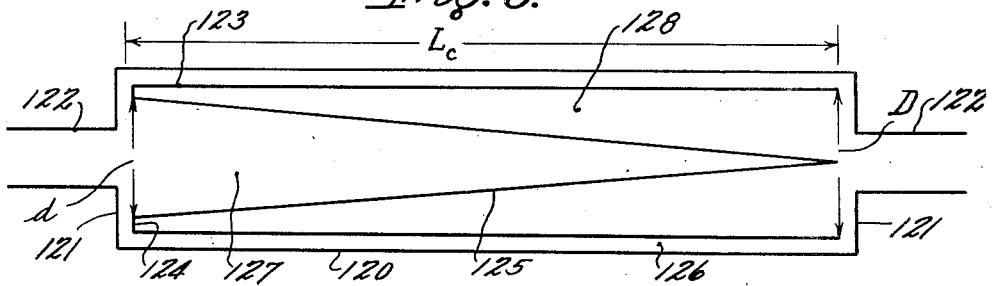
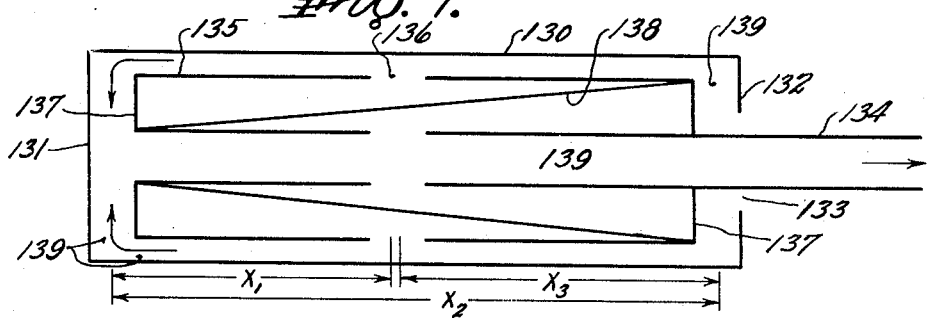
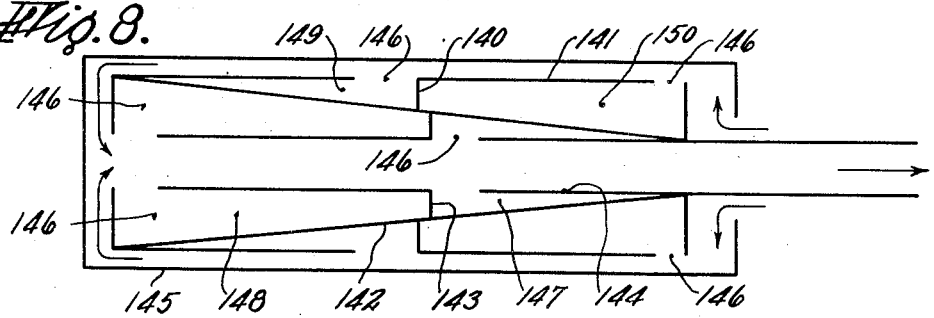
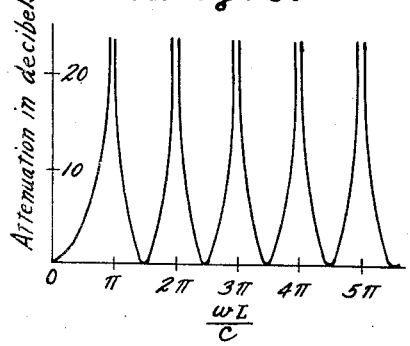
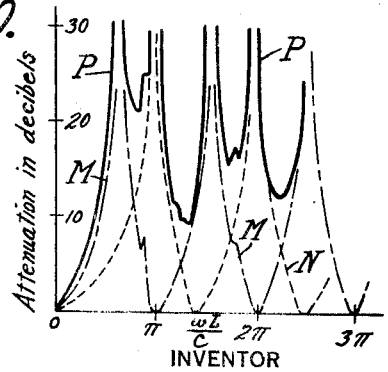
INVENTOR
ROLAND B. BOURNE
BY
Chapin + Neal
ATTORNEYS Patented Oct. 15, 1935

2,017,746

UNITED STATES PATENT OFFICE 2,017,746

SOUND ATTENUATING DEVICE

Roland B. Bourne, Hartford, Conn., assignor to The Maxim Silencer Company, Hartford, Conn., a corporation of Connecticut Original application April 30, 1934, Serial No. 723,085. Divided and this application December 14, 1934, Serial No. 757,552

9 Claims. (Cl. 181—0.5)

The present invention relates to sound attenuating devices of the reactive type wherein one or more acoustic sidebranches capable of showing resonance phenomena are coupled acoustically to a main conducting channel or other enclosure wherein may occur sound waves which are to be attenuated. A primary purpose of the invention is to provide acoustic sidebranches having novel characteristics, and to show how the acoustic characteristics of these sidebranches may be used in connection with the design of sound wave attenuating apparatus. A further purpose of the invention is to show how these characteristics may be applied to the design of silencers for use in connection with the exhausts or intakes of internal combustion engines, air compressors, blowers and the like. Further purposes and objects of the invention will be disclosed as the specification proceeds.

The acoustic sidebranches which are the main subject of this invention are designed and used on the basis that progressive change of phase as a function of distance occurs therein. For the purposes of the invention they will be referred to as "linear sidebranches". As an example of a sound wave attenuating device employing linear sidebranches having progressive change of phase therein, reference is made to Bourne, United States Patent No. 1,910,672, May 23, 1933.

There are in general, two types of linear sidebranches, i. e., those open at both ends, called "open" linear sidebranches and those closed at one end, called "closed" linear sidebranches. When acoustic sidebranches are used in connection with silencers for internal combustion engines and the like, the use of an open sidebranch may not be feasible since both exhaust gas and sound can leave through the open end. The open type sidebranch possesses certain acoustic properties, however, that make it desirable from an acoustic point of view. It is well known that a cylindrical tube of uniform cross sectional area, open at both ends, is substantially one-half wave length long for its fundamental natural period or frequency and also resonates to all substantially harmonic overtones thereof, both even and odd, whereas the closed tube of uniform cross sectional area is approximately one-quarter wave length long for its fundamental frequency and responds to odd harmonics thereof only.

Where reactive sidebranches are used as attenuating means for sound waves associated with exhaust and intakes of internal combustion engines and the like, it is desirable to offer attenuation not only to the fundamental frequency of the sound, but also all its overtones. It is obvious that an acoustic sidebranch which will respond to and attenuate a full series of harmonic tones and be entirely closed except for the point at which it is coupled to the sound-bearing enclosure or conduit is very desirable. Heretofore, it has been impossible to combine the advantages of a closed linear sidebranch with one showing a response to a full series of harmonic overtones, both even and odd.

I have discovered that a sidebranch in the form of a complete cone, open to the main sound channel at its large end and of course closed off at its pointed end, will respond to and attenuate a complete series of harmonic overtones which are substantially multiples of the lowest frequency for which it resonates. In one aspect of the invention I employ such complete cones as closed linear sidebranches in an acoustic silencing device, these sidebranches responding to and attenuating in the main channel or enclosure to which they are acoustically coupled, bands of frequencies, more or less wide, corresponding to and dependent upon the fundamental frequency of the conical sidebranches and all substantially integral multiples thereof, both even and odd. In another aspect of the invention I employ as sidebranches, in an acoustic silencing device, structures having a cross sectional area decreasing with the distance from their junction point with the main channel, sufficiently slender to give substantial attenuation to at least one consecutive overtone of their fundamental frequency, and having an opening into the main channel large enough to make the sidebranch operate mainly as a linear acoustic element.

Referring to the drawings,

Fig. 1 shows a truncated cone with open base, acoustically coupled at its base to a main conducting channel;

Fig. 2 shows a complete circular cone, continued to the apex, acoustically coupled at its base to a main conducting channel;

Fig. 3 shows in diagrammatic form a sound attenuating device embodying a single complete cone open at its base;

Fig. 4 is a section on line 4—4 of Fig. 3;

Fig. 5 shows in diagrammatic form a silencing device embodying side branches of special form acting somewhat as truncated cones;

Fig. 6 shows a simple sound attenuating device embodying a completely conical sidebranch and a second sidebranch having somewhat the properties of a truncated cone;

Fig. 7 shows a compact silencer suitable for intakes and the like;

Fig. 8 shows a somewhat similar device; and

Figs. 9 and 10 show the theoretical operating characteristics of the devices illustrated in Figs. 2 and 6 respectively.

This application is a division of my prior application Serial No. 723,085, filed April 30, 1934.

In order to understand the operation of the devices of the invention it is useful to make use of impedance relations, since the operation of sidebranches in general can be completely expressed in terms of the acoustic impedance "looking into" the branch.

For a truncated cone such as is shown in Fig. 1, the impedance per unit area at the base, or point of coupling to the main channel 40, in terms of the dimensions of the cone 41 having a partition or header 42 a distance $x_1$ from the apex and a slant length of $x_2-x_1$ may be mathematically shown to be $$Z_s = -i\sqrt{P_o\gamma\rho}\cdot\frac{\omega x_2}{C}\left[\frac{\sin\frac{\omega}{C}(x_2-x_1)+\frac{\omega x_1}{C}\cos\frac{\omega}{C}(x_2-x_1)}{\sin\frac{\omega}{C}(x_2-x_1)+\frac{\omega x_1}{C}\cos\frac{\omega}{C}(x_2-x_1)-\frac{\omega x_2}{C}\cos\frac{\omega}{C}(x_2-x_1)+\frac{\omega^2}{C^2}x_1 x_2\sin\frac{\omega}{C}(x_2-x_1)}\right] \quad (1)$$

In the above equation the symbols have the following significances, which hold true also for the further equations below with the changes and additions there noted:

$Z_s$ = acoustic impedance looking into the sidebranch.

$f$ = frequency of sound wave.

$\omega = 2\pi f$.

$C$ = velocity of sound in the medium.

$i = \sqrt{-1}$.

$P_o$ = mean pressure of the sound transmitting medium.

$\gamma$ = ratio of the specific heat of the medium at constant pressure to that at constant volume or, for waves of large amplitude, a function of this ratio.

$\rho$ = density of the medium.

$x_1$ = slant distance from the apex of the cone to its closed end (see Fig. 1).

$x_2$ = slant distance from the apex of the cone to its junction with the main conducting channel, allowing for any necessary end correction.

It may be noted, in order to permit comparison with formulas for other types of silencing units given by different authors, that $$-i\sqrt{P_o\gamma\rho} = -i\rho C$$

In Fig. 1 the conical sidebranch is connected to the main channel at its larger end, and diminishes in cross section area in a direction away from the main channel. In the case of a true cone this change in cross sectional area is a simple function of the distance, while for certain sidebranches to be described below, the area depends upon the distance from the channel in a somewhat more complex manner. It should be noted particularly that the sidebranch decreases in area in a direction away from the main channel, as the performance is entirely different if the cone is turned with its small end toward the channel. As will now be shown Equation (1) may be used as the basis for determining many of the acoustical characteristics of either truncated or complete cones connected to the channel at their large ends.

In Fig. 2, the truncated cone of Fig. 1 is continued to the apex. In this figure, the cone 43 of length $L_c$ is acoustically coupled to the main conducting channel 44. In this case, $x_1=0$, whence, substituting for $x_2$ its equivalent $L_c$, Equation (1) reduces to $$Z_s = i\sqrt{P_o\gamma\rho}\left(\frac{1}{\cot\frac{\omega L_c}{C}-\frac{1}{\frac{\omega L_c}{C}}}\right) \quad (2)$$

or $$Z_s = i\sqrt{P_o\gamma\rho}\left(\frac{\tan\frac{\omega L_c}{C}}{1-\frac{\tan\frac{\omega L_c}{C}}{\frac{\omega L_c}{C}}}\right) \quad (3)$$

To find the natural frequencies of such a cone, we place $v_s=0$.

To satisfy this relationship, $$\tan\frac{\omega L_c}{C}=0$$

whence $$\frac{\omega L_c}{C}=\pi,\ 2\pi,\ 3\pi,\ \text{etc.}=n\pi$$

where $n$ is any positive integer, either even or odd. Therefore $$L_c=n\frac{\lambda}{2}$$

a result identical to that applying to a cylindrical tube open at both ends commonly called an "open" tube.

We now have an acoustical resonating device, completely closed except for an opening whereby it may be acoustically coupled to a main conducting channel and capable of being used to attenuate certain groups of sound frequencies comprising a fundamental group and all multiples thereof, both even and odd. The use of the term group rather than frequency is justified by the fact that resonating devices of the acoustic type exert their influence not only upon the theoretical single frequencies of resonance but also upon neighboring frequencies. The exact nature of the behavior of this type of resonating device under various conditions will be disclosed as the specification proceeds, and the advantages of certain specific arrangements will be shown.

In order to show the attenuating effect of a complete cone acoustically coupled to a main conducting channel upon sound waves therein, it is proper to first investigate the performance of a single such sidebranch, coupled to a relatively long main conducting channel. The attenuation in decibels may be shown to be $$Ndb = 10\log_{10}\left[1+\left(\frac{S_2}{2S_1}\right)^2\left(\cot\frac{\omega L_c}{C}-\frac{1}{\frac{\omega L_c}{C}}\right)^2\right] \quad (4)$$

where $S_2$ is the area of the base of the cone.

$S_1$ is the area of the main conducting channel.

A plot of Equation (4) is shown in Fig. 9, for the condition that $S_2/S_1=4$.

In order to obtain a larger area for the base of the cone than exists in the main conducting channel, the cone may be disposed within a casing after the manner shown in Fig. 3. In this embodiment, the cone 45 is supported within the casing 46 in any convenient manner, making due allowance for the passage of gas between the base of the cone and the casing and between the end of the cone and the header 47. The specific supporting construction is not shown in detail as it is not necessary for a complete understanding of the invention. It is seen that the open base of the cone is located directly opposite to and closely adjacent the opening in the header 47 leading into the channel 48 which forms part of the main conducting channel through the device. In this particular embodiment of the invention, the space between the outside of the cone and the inside of the shell or casing is utilized to the purpose of attenuating sounds of relatively high frequency, such as bang and hiss noises usually associated with internal combustion engine exhausts. I have shown a simple baffle plate system 49 to represent such a high frequency attenuating means. Many arrangements of passageways, partitions, etc. may be used to advantage in this regard. The apex of the cone may be supported either by brackets or by a partition 50 extending from the casing to the cone and having therein holes 51 for the passage of the gas therethrough. It is theoretically preferable, in this and other embodiments, that the sidebranch retain its conical shape up to the point of coupling to the main channel. In some cases, however, it may be desirable for constructional reasons to depart from the normal conical shape adjacent the zone of coupling. The departure from the theoretical response occasioned by this slight change in shape will in most cases be of no practical consequence.

Referring again to Fig. 9 it is seen that maximum attenuation occurs at values of $$\frac{\omega L_c}{C} = \pi, 2\pi, 3\pi, 4\pi, \text{etc.}$$

which is the same as would be obtained for an "open" cylindrical tube of the same length. Such a tube would have an attenuation peak at zero frequency. It is to be noted that the conical sidebranch does not offer attenuation to zero frequency, the attenuation decreasing continuously from a high value at $$\frac{\omega L_c}{C} = \pi$$

to zero at $$\frac{\omega L_c}{C} = 0$$

as shown. The points of zero attenuation are not midway between the points of maximum attenuation, as they are in the case of the "open" cylindrical sidebranch, but are displaced slightly therefrom, the displacement becoming less as the frequency increases. It can be shown, by a consideration of Equation (4) that the condition for zero attenuation is given by the relation.

$$\tan \frac{\omega L_c}{C} = \frac{\omega L_c}{C}$$

The first few roots of this equation are known to be $$0, 1.4303\pi, 2.459\pi, 3.471\pi$$

It is seen that these successive values show a decreasing difference from the midway points, namely $1.5\pi$, $3.5\pi$, etc. approaching $$\frac{n\pi}{2}$$

as a limit, where $n$ is any odd integer. It is to be noted at this time that the area under the curve is larger as the ratio $S_2/S_1$ is made greater; and, since this area represents a measure of the usefulness, in attenuating sounds of many frequencies, of the device for which the curve shows operating characteristics, it is frequently desirable to make $S_2$ as large compared with $S_1$ as is commercially feasible with proper regard for the limitations imposed by acoustic theory.

Fig. 5 shows an extremely simple embodiment of the invention comprising a casing 96, a main conducting channel 97 centrally disposed within said casing and of such length that openings are left whereby the two sidebranches 98, 99 are acoustically coupled to the channel 97 as shown. Said sidebranches 98, 99 are formed by a conical member 100 extending from one end of the conduit 97 to the inside of the casing 96 at a point opposite the other end of the conduit 97 and may be described as being of conico-annular form. These sidebranches, it has been found by experience, conspire to offer maximum attenuation in the main conducting channel to sound frequencies substantially the same as those frequencies which would be highly attenuated by truncated true cones, closed at the small end, open at the base, and having a ratio between the area of the base and the area of the header forming the truncated cone, of 9:1. The impedance of such a truncated cone may be written $$Z_{T_c} = -i\sqrt{P_0 \gamma \rho}\left[\frac{1 + \frac{\omega L}{2C}\cot\frac{\omega L}{C}}{\frac{2}{3\omega L} + \frac{\omega L}{2C} - \frac{2}{3}\cot\frac{\omega L}{C}}\right] \quad (7)$$

The resonating frequencies for such a sidebranch are given by $$-2\tan\frac{\omega L}{C} = \frac{\omega L}{C} \quad (8)$$

The roots of this equation are found to be approximately $$.73\pi, 1.62\pi, 2.58\pi, 3.57\pi, \ldots$$

For high frequencies, it is seen that these values approach the value $$\frac{n\pi}{2}$$

where $n$ is odd, and therefore, for high orders of overtones, the device behaves, insofar as attenuation peaks are concerned, substantially as a closed cylindrical sidebranch. The points of zero attenuation may likewise be shown to occur at values of $$\frac{\omega L}{C} = n\pi$$

where $n$ is any integer. Where two such sidebranches are separated a distance L along a main conducting channel, as in Fig. 5, the device forms a wave filter, the transmission and attenuation characteristics of which are given by $$\cosh \Gamma = \cos\frac{\omega L}{C} - \frac{S_2}{2S_1}\sin\frac{\omega L}{C}\left[\frac{\frac{2}{3\omega L} + \frac{\omega L}{2C} - \frac{2}{3}\cot\frac{\omega L}{C}}{1 + \frac{\omega L}{2C}\cot\frac{\omega L}{C}}\right] \quad (9)$$

A consideration of Fig. 5 further discloses that the larger the ratio $S_2/S_1$, the more nearly the operation of the sidebranch 99 approaches that of a true complete cone, while the operation of the sidebranch 98 approaches that of a cylinder.

As has been shown previously, the combination of a cone and cylinder to form acoustic sidebranches results in useful frequency-attenuation characteristics.

Fig. 6 shows a simple constructed sound wave attenuation device having unique acoustic characteristics. It comprises a cylindrical casing 120 and end headers 121 fitted with inlet and outlet openings 122. Suitably mounted within said casing is a cylindrical member 123 open at one end and having a diameter D, cross sectional area $S_2$. The member 123 is closed at the other end by a header 124 having a circular opening therein of diameter $d$ and cross sectional area $S_3$. Affixed to the header 124 is a cone 125 extending coaxially within the cylindrical member 123 and of substantially the same length, as shown. It will be seen that the main conducting channel 126 has coupled to it the conical sidebranch 127 and the conico-annular sidebranch 128. One preferred design embraces a certain relation between $S_3$ and $S_2$. By making $S_3 = \frac{3}{4}S_2$ the conico-annular sidebranch becomes approximately equivalent to a truncated cone wherein, referring to Fig. 1, $x_2 = 2x_1$. Letting $x_2 - x_1 = L_c$, Equation (1) reduces to $$Z_e = -i\sqrt{P_0 \gamma \rho} \left[ \frac{1 + \frac{\omega L_c}{C} \cot \frac{\omega L_c}{C}}{\frac{1}{\frac{2\omega L_c}{C}} + \frac{\omega L_c}{C} - \frac{1}{2}\cot \frac{\omega L_c}{C}} \right] \quad (10)$$

and the attenuating effect of a sidebranch operating in accordance with Equation (10), on sound waves in the main conducting channel may be expressed by $$Ndb = 10\log_{10}\left[ 1 + \left(\frac{S_2}{2S_1}\right)^2 \left( \frac{\frac{1}{\frac{2\omega L_c}{C}} + \frac{\omega L_c}{C} - \frac{1}{2}\cot\frac{\omega L_c}{C}}{1 + \frac{\omega L_c}{C}\cot\frac{\omega L_c}{C}} \right)^2 \right] \quad (11)$$

A plot of Equation (11) is shown in Fig. 10, curve M. Curve N, due to the conical sidebranch 127, is similar to that of Fig. 9. The combined effect is shown at P. A feature of the embodiment of the invention shown in Fig. 6 is the short length, made possible by the telescoping of the cone within the cylinder, as shown.

Fig. 7 shows a compact silencer suitable for intakes and the like where but one pipe connection is necessary. It comprises a casing 130 having an imperforate end header 131 and an end header 132 having an opening 133 therein which is large compared to the diameter of a centrally disposed conduit 134 which extends therethrough into the interior of the device, and provides means for attaching the silencer to the apparatus with which it is used. Within the casing 130 is a suitably mounted cylindrical member 135 having openings 136 therein, headers 137 extending from each end of the member 135 to the centrally disposed conduit 134. A conical member 138 extends from one end of the interiorly disposed conduit 134 to the remote end of the cylindrical member 135 substantially as shown. The spacing of the various elements is such as to form the main conducting channel 139 partly as a centrally disposed tubular conduit and partly as an annular conduit. It is seen that this construction affords two sets of acoustical sidebranches each coupled to the main conducting channel at distant points along its length and that each side branch system comprises two dissimilar conico-annular chambers in parallel. By a suitable use of equations already given and by the proper choice of the dimensions $x_1$, $x_2$, and $x_3$, it is possible to design this device for practically any acoustic performance within limits of the theory.

Fig. 8 shows a device somewhat similar in appearance to that of Fig. 7, but with important acoustical differences. Annular header 140 extending from the interiorly disposed cylindrical casing 141 to the conical member 142 and an annular header 143 extending from the conical member 142 to the centrally disposed conduit 144 together with the casing 145 and suitable openings 146 conspire to form the four acoustical sidebranches 147, 148, 149 and 150 each of which may have different acoustic characteristics. Proper proportioning of the various elements of the device results in a relatively complete attenuation spectrum. In both Figs. 7 and 8 the path of the gases through the device is shown by arrows.

I claim:

1. A sound wave attenuating device comprising a closed acoustic sidebranch having a cross sectional area decreasing from one end of the sidebranch to the other, and acoustically coupled to a main conducting channel at a point intermediate the length of the sidebranch.

2. A sound attenuating device comprising a main sound conducting channel having coupled thereto, at separated points along the length thereof, closed acoustic sidebranches in parallel, one of said paralleled sidebranches increasing in cross sectional area and another of said sidebranches decreasing in cross sectional area.

3. An acoustic sidebranch wherein change of phase or wave motion takes place, the cross sectional area of said side branch increasing continuously from one end thereof to the other, said sidebranch being acoustically coupled, at a point intermediate the length thereof, to an enclosure wherein sound waves may travel.

4. A sound attenuating device comprising a cylindrical casing, closed at one end and having inlet and outlet openings both at the other end thereof, a nested shell assembly interiorly disposed within said casing whereby is formed an outer annular main sound conducting channel and an inner sound conducting channel connected in series and extending from said inlet opening to said outlet opening in said casing, and means associated with both of said channels to selectively attenuate predetermined sound frequencies occurring in said channels.

5. A sound wave attenuating device in accordance with claim 4 wherein are acoustically coupled to said channels, pairs of unlike closed acoustic sidebranches in parallel.

6. A sound wave attenuating device in accordance with claim 4, said sound attenuating means comprising a linear acoustic sidebranch of continuously changing cross sectional area acoustically coupled to said channels at a point intermediate the length of said sidebranch.

7. A sound wave attenuating device in accordance with claim 4 having the parts so proportioned that the sound frequencies attenuated in said outer annular channel are intermediate the sound frequencies attenuated in said inner sound conducting channel.

8. A sound attenuating device in accordance with claim 4 wherein one or more closed acoustic sidebranches are acoustically coupled to each of said sound conducting channels and wherein parts are so proportioned that the lowest sound frequency attenuated by one of said side-branches does not correspond to the lowest sound frequency attenuated by another of said side-branches.

9. A sound wave attenuating device comprising three nested cylindrical shells the innermost of which forms a sound conduit connected in series with an annular conduit formed by the space between the outermost two shells, a conical partition extending from a point adjacent one end of said innermost shell to a point adjacent the other end of the intermediate cylindrical shell, an opening in said innermost shell communicating with the space formed between said innermost shell and said conical partition, an opening in said intermediate shell communicating with the space formed between said intermediate shell and said conical partition.

ROLAND B. BOURNE.

Certificate of Correction

Patent No. 2,017,746.                                                                                                    October 15, 1935.

ROLAND B. BOURNE

It is hereby certified that errors appear in the printed specification of the above numbered patent requiring correction as follows: Page 2, second column, line 17, for "$U_8=0$" read $Z_8=0$; and line 72, for "then" read *than*; and that the said Letters Patent should be read with these corrections therein that the same may conform to the record of the case in the Patent Office.

Signed and sealed this 19th day of November, A. D. 1935.

LESLIE FRAZER,

[SEAL]                                                                                                   *Acting Commissioner of Patents.*